United States Patent Office 3,539,658
Patented Nov. 10, 1970

3,539,658
AIR DRYING POLYURETHANE COATING COMPOSITION COMPRISING ORGANIC POLYISOCYANATE MIXED WITH A RESINOUS POLYHYDRIC ALCOHOL HAVING AN ORGANOSILICON RESINOUS MATERIAL CONDENSED THEREIN
Kazys Sekmakas, Chicago, Ill., and Frank Daar, Berkeley, Calif., assignors to De Soto, Inc., Des Plaines, Ill., a corporation of Delaware
No Drawing. Filed Nov. 13, 1967, Ser. No. 682,566
Int. Cl. C08g 47/10; C08f 21/00
U.S. Cl. 260—827　　　　　　　　　　　　　9 Claims

ABSTRACT OF THE DISCLOSURE

Weather resistant air drying polyurethane solution coating compositions are provided containing organic polyisocyanate in admixture with a resinous condensate of an organosilicon resinous material, such as an organopolysiloxane, condensed with a resinous polyhydric alcohol, such as a solution addition copolymer of hydroxy ethyl methacrylate with acrylate and methacrylate esters. The coatings are applied from concentrated solution in inert organic solvent and are particularly intended for application to outdoor wood substrates. The coatings are also strongly adherent to metal surfaces including non-ferrous surfaces and resist elevated temperatures.

---

The present invention relates to air drying coating compositions such as paints which are adapted to dry upon mere exposure to air at ambient temperatures to produce coatings having markedly superior resistance to the elements. While numerous air-drying paints are available, these lack long term resistance to the elements, especially when they are applied to wood surfaces which swell and shrink with changing conditions of temperature and moisture. While certain valuable coatings can be applied by baking, it will be understood that the use of elevated temperatures is frequently not available in the painting of wooden surfaces, e.g., when one paints the wood surfaces on the exterior of a home, it is not feasible to bake the finish which is applied. Also, the invention provides coatings which show better adhesion to metal surfaces, especially when they are exposed to water, and superior high temperature integrity and durability. Adhesion to nonferrous metal surfaces is particularly contemplated.

In accordance with the invention, a two component system is provided which, upon admixture of the separate components and application of the mixture to the surface to be coated, cures at room temperature.

The first component of the system is a resinous polyhydric alcohol which has been condensed with an organosilicon resinous material containing a plurality of silicon-carried hydroxy or alkoxy groups.

The second component of the system is an organic polyisocyanate which is preferably unblocked so as to be reactive at room temperature with the functionality of the first component, such functionality preferably including not only the silicon-carried hydroxy or alkoxy groups, but desirably also includes conventional hydroxy groups carried by the resin with which the organosilicon resinous material was condensed.

While air curing mixtures of resinous polyhydric alcohols and organic polyisocyanates are known, these have not been well adapted for the painting of wood surfaces and they have lacked the extraordinary weather resistance which is conferred by the organosilicon resinous material which may, in accordance with the invention, constitute as much as from 30–40% of the total weight of the condensate which is blended with the polyisocyanate. These air curing mixtures have also lacked superior resistance to elevated temperature and the invention upgrades the mixture by a factor of from 75–100° F.

Referring first to the resinous polyhydric alcohols which are utilized in accordance with the invention, it will be appreciated that these may be of diverse type so long as the material selected is soluble in organic solvents and contains the required hydroxy functionality. However, since long term resistance to the elements is of especial importance, vinyl aromatic compounds such as styrene should be avoided and the preferred polyhydric alcohols are addition copolymers largely constituted by esters of monoethylenically unsaturated monocarboxylic acids such as acrylic acid, methacrylic acid and crotonic acid.

The hydroxy functionality of the resinous polyhydric alcohol may broadly vary 1 to 20% by weight of the hydroxy group, preferably from 2 to 15%, more preferably from 3–10% by weight of the hydroxy group based on the resinous polyhydric alcohol.

While it is preferred that the hydroxy group be the only functional group available in the resin, small proportions of other functional groups do not interfere, especial reference being made to the fact that small proportions of the carboxy group may be present and frequently is present when hydroxy functional polyesters are employed.

As has been stated, it is preferred to use addition copolymers and these are polymers made by solution copolymerization of monomers including hydroxy functional monomers.

The solution copolymerization referred to is wholly conventional. As is well known, the monomers are polymerized in solution to form a polymer which is soluble in the organic solvent selected and the reaction is carried out in the presence of free-radical polymerization catalyst. Catalyst selection is wholly conventional and is illustrated by t-butyl perbenzoate, cumene hydroperoxide and benzoyl peroxide.

When the hydroxy group is provided by copolymerization of an hydroxy-functional monomer, the preferred monomer is 2-hydroxy ethyl methacrylate, but glycerol mono allyl ether will also help to typify the class which also includes other hydroxy alkyl acrylates and methacrylates such as 2-hydroxy propyl acrylate, 4-hydroxy butyl acrylate and the corresponding methacrylates and crotonates.

Still further hydroxy-containing monomers which may be used are ethylene glycol allyl ether, propylene glycol allyl ether, butylene glycol allyl ether, diethylene glycol allyl ether, trimethylol propane allyl ether and 2-hydroxymethyl-5-norbornene (either the endo isomer or the exo isomer or mixtures thereof). Still further, allyl alcohol, methallyl alcohol, crotyl alcohol and unsaturated fatty alcohols corresponding to drying oil fatty acids may be used. Hydroxy ethyl methacrylate will be used as illustrative in the examples. It is also possible to provide the desired hydroxy functionality or to supplement the available hydroxy functionality by reaction of copolymer acidity with monoepoxide.

The balance of the copolymer is desirably constituted by monoethylenically unsaturated materials, especially those containing the $CH_2=C<$ group. Even within this class, selection can have importance and the acrylate, methacrylate and crotonate esters are especially preferred. As noted hereinbefore, the vinyl aromatic compounds such as styrene or vinyl toluene degrade the weather resistance properties of the final resin, and are therefore desirably absent.

It is preferred in accordance with the invention to use combinations of monomers which form hard polymers, such as methyl methacrylate, with monomers which form soft polymers, such as acrylate and methacrylate esters illustrated by ethyl acrylate, n-butyl or isobutyl acrylate, 2-ethylhexyl acrylate, butyl methacrylate and the like. Other monomers which may be included are illustrated by vinyl chloride, vinyl acetate, acrylonitrile, n-butyl vinyl ether, dibutyl maleate, etc.

With reference to the optional presence of carboxyl functionality, up to about 5% by weight of carboxyl-containing component may be present in the copolymer. Monomers which may be used to supply the carboxyl group are acrylic acid, methacrylic acid, crotonic acid, monobutyl maleate, maleic acid and the like.

Similarly, and while the invention is preferably illustrated by copolymers constituted exclusively by the addition copolymerization of monoethylenically unsaturated components, minor quantities of polyethylenically unsaturated components may be included in amounts up to about 10% of the weight of the copolymer, so long as the solubility of the copolymer is not unduly reduced or its physical and chemical properties unduly degraded.

To complete the discussion of solution addition copolymers useful in the invention, these copolymers are desirably of relatively low molecular weight to facilitate solvent solubility. While mercaptan chain-terminating agents are well known for the purpose of lowering molecular weight, they are not preferred in an isocyanate system and are not employed. When it is desired to limit molecular weight, techniques such as elevated polymerization temperature, low resin solids content, or large catalyst proportion can be used. Also chain terminators that do not contain sulfur such as p-chlorotoluene or vinyl cyclohexene may be used. Normally, however, no molecular weight inhibitors are necessary and the hydroxy copolymers show good solubility even at high solids content.

The particular nature of the organic solvent used for the solution copolymerization is not a critical aspect of the invention so long as it is not reactive with the isocyanate group. Ketones, such as methyl isobutyl ketone, and esters, such as 2-ethoxy ethanol acetate, are preferred solvents, but the invention is not limited to specific solvents since many others are available and useful, such as xylene, toluene, methyl ethyl ketone, acetone, butyl acetate, etc. These same solvents are useful irrespective of the nature of the resinous polyhydric alcohol and are also used for the solvent solution coating application of the completed resinous system.

The resinous polyhydric alcohols may also be constituted by organic solvent soluble hydroxy functional polyester resins. As is well known, polyesters are formed by the polyesterification of polycarboxylic acids with polyhydric alcohols and the invention embraces the use of numerous materials. However, and in order to form the soluble hydroxy functional materials needed in the invention, the reactants and their proportions are selected to possess a substantial excess of hydroxy functionality over carboxy functionality. At least a 25% excess of hydroxy functionality should be used and it is preferred to use a still larger excess of at least 50%.

The polyhydric alcohols which can be used are illustrated by ethylene glycol, diethylene glycol, butylene glycol, hydrogenated bisphenols, as well as aliphatic compounds of higher functionality such as glycerin, trimethylol propane and pentaerythritol which are desirably present to minimize solution viscosity in an amount of from 5 to 25% of the total hydroxy functionality. Small amounts of monohydric alcohols such as butanol may be present as a chain stopper, but this is not essential.

The polycarboxylic materials may be present as acids or anhydrides and equivalent materials such as esters with methanol and acyl chlorides are also useful. The various phthalic acids are typical and the aliphatic dicarboxylic acids such as succinic and adipic acids are also appropriate. Tricarboxylic and higher functional acids may also be used, illustrated by trimellitic acid or its anhydride.

The preferred polyesters are oil-free. Oils including drying oils and the fatty acids derived therefrom do not help the desired long term durability and are preferably absent. Similarly, and while it is theoretically possible to use unsaturated materials such as maleic or fumaric acids and the like, unless copolymerization is intended as previously noted there is no purpose in encountering the expense of such materials when the saturated materials will do the job, and provide materials of better stability.

The resinous polyhydric alcohol is condensed with the silicon-containing materials e.g., an hydroxy or alkoxy functional polysiloxane, to incorporate the siloxane component into the resin. The siloxane can be used in an amount of from 10 to 50%, based on the weight of the final condensate, more usually from 20–45%. Typical use is illustrated by 30% by weight. The use of more than 20% of the siloxane is a feature of the invention since it is not usual to be able to accommodate such a large proportion. A high proportion of siloxane is desirable from the standpoint of providing good film properties such as high resistance to the elements. Normally, the use of large proportions of siloxane resin degrade the rapid curing character of the resin, and the films produced are normally brittle and of limited utility. However, and by utilizing a cure with polyisocyanate in the manner of the present invention, these drawbacks are overcome and a useful product is obtained.

Broadly speaking, the silicon-containing material which is used in accordance with the invention may be hydroxy functional or alkoxy functional as indicated hereinbefore, these two classes of materials being similar from many standpoints. Thus, the silicon-containing material should contain an average of at least 1.2 silicon OH or alkoxy groups per molecule, and the functionality of the material is preferably higher. On the other hand, there are aspects of non-equivalence and the present invention prefers hydroxy termination for more complete cure with the polyisocyanate. Among the alkoxy terminated materials, methoxy termination is most volatile at room temperature and is preferred.

Although the differently terminated materials are closely analogous, the OH-terminated materials and the alkoxy-terminated materials will be separately described, the OH-terminated materials being conveniently referred to as polysilanols.

The polysilanol component which is reacted with the hydroxy functional copolymer is a silicon-containing compound containing an average of at least 1.2 silicon OH groups per molecule, preferably about 2 silicon OH groups per molecule. The term silicon OH groups identifies compounds in which the OH groups are attached directly to silicon as in compounds of the formulae:

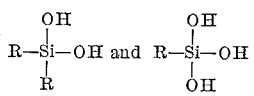

wherein R is an organic radical and preferably a hydrocarbon radical, such as an alkyl, alkenyl, cycloalkyl, aryl, alkaryl or aralkyl radical. These silanols are exemplified by diphenyldihydroxysilane, dicyclohexyldihdroxysilane, phenyltolydihydroxysilane, xylytrihydroxysilane, phenyltrihydroxysilane, octyltrihydroxysilane, vinyltrihydroxysilane, and chlorophenyltrihydroxysilane.

Another group of compounds containing a plurality of silicon OH groups are the siloxanols, i.e., compounds of the formula:

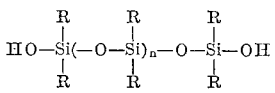

wherein R is an organic radical and preferably a hydrocarbon radical such as an alkyl, alkenyl, cycloalkyl, aryl, alkaryl, aralkyl radical, and $n$ is an integer from 0 to as high as 60 or more. Such materials may be exemplified by tetramethyldisiloxanediol

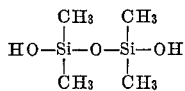

tetraphenyldisiloxanediol, tetraxylyldisiloxanediol, hexacyclohexyltrisiloxanediol, octaoctyltetrasiloxanediol, diphenyldimethyldisiloxanediol, dibutyldiethyldisiloxanediol and the like.

Preferred members of this group comprise the organopolysiloxanediols, and particularly the polyalkylpolysiloxanediols, the polyarylpolysiloxanediols and the polycycloalkylpolysiloxanediols, which preferably contain no more than 12 carbon atoms in each aryl, alkyl or cycloalkyl radical.

Another group of compounds containing a plurality of silicon OH groups are those having two or more silicon atoms bound together through divalent organic radicals, such as those of the formula

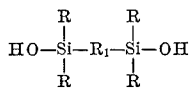

wherein R is another OH group or a hydrocarbon radical, preferably an alkyl, alkenyl, cycloalkyl, aryl, alkaryl or aralkyl radical, and $R_1$ is a divalent organic radical, such as methylene or polymethylene radical, arylene or polyarylene radical, cycloalkylene or polycycloalkylene radical, or aralkylene or polyaralkylene radicals, or oxy or thio-substituted derivatives of the foregoing members. Examples of this group include, among others, ethylene bis(trihydroxysilane), p-phenylene-bis(dimethylhydroxysilane), p-cyclohexylene-bis(dibutylhydroxysilane), 1,6-hexamethylene-bis(dimethylhydroxysilane), and 1,5-pentamethylene-bis(dibutylhydroxysilane). Particularly preferred members of this group comprise the alkylene-bis(dihydrocarbylhydroxysilanes), the arylene-bis(dihydrocarbylhydroxysilanes), and the cycloalkylene-bis(dihydrocarbylhydroxysilanes). The preparation of many of these preferred silicon-containing compounds is illustrated in U.S. Pat. No. 2,561,429.

Still another group of compounds containing a plurality of silicon OH groups are the hydroxy-containing esters obtained by reacting any of the above-described silicon-containing polyhydric alcohols with mono- or polycarboxylic acids so that at least one of the OH groups remains unesterified. Preferred members of this group comprise those of the formula

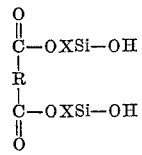

wherein R is a residue of polycarboxylic acids, such as phthalic acid, maleic acid, adipic acid, terephthalic acid, and the like, and X is the residue of the silicon-containing polyhydric alcohol as described above.

Referring to preferred polysilanols, it is pointed out that organo silanes hydrolyze to form organo silanetriols, for example:

$$RSiX_3 + 3H_2O \rightarrow RSi(OH)_3 + 3HX$$

The hydrolysis is promoted by the use of mineral acids as catalysts and by heating up to 100° C. The organosilanetriols thus formed polymerized by condensation either spontaneously or by further heating up to 180° C., to form a polyorgano-siloxane having the structural unit:

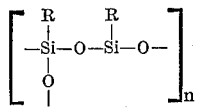

in which n denotes the average number of recurring groups in the resinous molecule.

As a preferred embodiment of the invention, an intermediate is formed by stopping the condensation reaction before completion as by cooling or neutralization. The resinous intermediate so formed has the following average structural formula in which R″ indicated an organic group, which is desirably alkyl or aryl, but preferably phenyl:

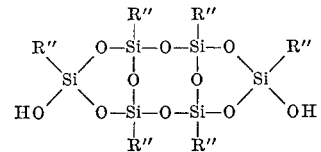

The specific hydroxy silicone resinous material having substantially the above structure in which R″ is phenyl and which is hereinafter referred to as disilanol "A" has the following physical characteristics:

Hydroxy content: 3.9%.
Average molecular weight: 1,600.
Combining weight (grams providing 1 gram mol of OH functionality): 400.

It should be noted that the disilanol "A" is self-evidently a material having an hydroxy functionality higher than 2 and a molecular weight higher than shown by the idealized formula. However, the term "disilanol" identifies the idealized structure and the ring opening or self-condensation which occurs in commerce accounts for the variation from the theoretical in molecular weight and hydroxy functionality. Also, and since combining weight is determined by esterification at elevated temperature with an organic acid (which leads to further ring opening and self-condensation), the combining weight does not necessarily compare exactly with the hydroxy content. Also, commercial products of the type noted above are available with an average molecular weight of 1200 and a combining weight of 425 and with hydroxy values of about 4–5%.

From the standpoint of alkoxy-functional materials, these may broadly correspond to any of the hydroxy functional materials which have been referred to hereinbefore, it being merely necessary to etherify the OH group with an alcohol in order to generate the alkoxy group. On this bases, it will be understood that alkoxy derivatives which correspond to each of the OH-terminated materials referred to previously can be utilized, and the etherification can be complete or partial so that the final silicon-containing compound may include mixtures of alkoxy groups and OH groups.

With respect to the alkoxy group, methyl alcohol is more volatile than the higher alcohols and, accordingly, the methoxy groups is preferred to the ethoxy or butoxy groups, though all of these are useful as are other etherifying alcohols and ether alcohols such as, 2-ethoxy ethanol and 2-butoxy ethanol.

The preferred silicon-containing materials are polysiloxanes, and it will be understood that both alkoxy and OH-containing polysiloxanes can be made in a similar fashion, e.g., by hydrolyzing an alkoxysilane such as phenyltriethoxysilane or dimethyldimethoxysilane.

Since the removal of water and alcohol can proceed at the same time, the hydrolysis of alkoxy silanes can produce siloxanes which contain both hydroxy and alkoxy functionality and polymeric alkoxy silane hydrolysates are available with detectable hydroxy and alkoxy contents.
polysiloxane identification, preferred organopolysiloxanes polysiloxane identification, preferred organ polysiloxanes have the following unit formula:

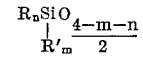

where R is a monovalent hydrocarbon radical, R′ is selected from the group consisting of alkoxy redicals and the hydroxyl radical, $n$ has an average value of 1 to 2, and $m$ has an average value of at least 0.1, the sum of $m$ and $n$ being no more than 3, there being an average of at least 1.2 R′ groups present per organopolysiloxane molecule.

In the above description the preferred value for $m$ is from 0.5 to 1.1, and the average number of R′ groups per molecule does not exceed 10 and is preferably in the range of from 2–8.

Preferred hydrocarbon-substituted polysiloxanes are illustrated by dimethyl triphenyl trimethoxy trisiloxane or hydrolysates of the same which contain from 5–20% by weight of the methoxy group. The base compound can be referred to as having the following average chemical formula:

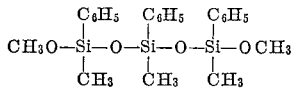

In practice, a compound of the above formula is available with an average molecular weight of 470, a combining weight of 155 and a methoxy content of 20% by weight. This product has a viscosity at 77° F. of 13 centistokes (A–3 on the Gardner scale).

Another appropriate product is obtained by hydrolysing the above described trisiloxane to reduce the methoxy content to 15% by weight, which increases its molecular weight until the viscosity at 77° F. is from 60–120 centistokes (B to E on the Gardner scale).

An especially preferred hydrocarbon substituted polysiloxane is a compound having the formula:

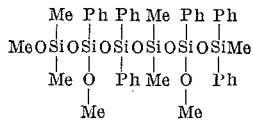

in which Ph identifies the phenyl group and Me the methyl group. A commercially available material having the above structure has a weight percent methoxy of 13.9%.

The condensation reaction between the silicon-OH group and the hydroxy group is carried out at a temperature ranging from 250° to 350° F. (120°–200° C.). Ordinarily it is preferred to conduct the reaction under a reduced pressure in order to speed the removal of the volatile product of the reaction, e.g., water in the case of an hydroxy siloxane and alcohol in the case of an alkoxy siloxane.

It is desirable in the condensation reaction to employ a catalyst which facilitates the reaction. Organic acids, such as naphthenic acid, and organic titanates, such as tetrabutyl titanate, are useful for this purpose. The use of the catalyst is not essential, but it does facilitate the condensation reaction and is helpful.

While the proportion of the silicon resinous material has previously been described it is preferred to employ approximately stoichiometric proportions of silicon-OH or alkoxy with respect to the hydroxy group in the resinous polyhydric alcohol. While preferred practice uses stoichiometric proportions, the term "approximately" identifies a balance which may vary ±25%, less preferably ±50%. While the stoichiometry noted is preferred, it is not an essential of the invention so long as the weight percent of silicon resinous material is within the range defined in the resinous condensate.

Broadly speaking, from 5–95% of the silicon-carried OH or alkoxy groups must be reacted to properly combine the materials being reacted without gelation. On the other hand, it is preferred that at least 25% of the silicon-OH or alkoxy group be combined by the reaction, more preferably 50%.

Referring more particularly to the final resin condensate which is produced, it is preferred that this final resin condensate include at least some residual hydroxy functionality as measured by an hydroxy value of at least 10, preferably at least 25.

It is also desired to point out that the final resin condensate of the invention possesses considerable solubility in common organic solvents enabling coating solutions of the invention to be applied at high resin solids content, e.g., a resin solids content of at least 30%, preferably at least 40% by weight. Broadly, a solids content of at least 20% is desirable for satisfactory application, and it is difficult to provide solutions with a solids content above 85% and still have the mixture thin enough for brushing or like application. Also, and while the bulk of the discussion has been directed to clear solutions, it will be understood that the solution of final resin condensate is frequently pigmented or dyed as by the inclusion of titanium dioxide, zinc oxide or the like. Since the pigmentation, dyeing, etc. of solvent solution house paints represents common knowledge in the field, this aspect of the development will not be discussed at length except to point out that the solution of resin condensate provides the bulk of the coating composition so that the pigment or dye which is used would be dispersed in this portion of the final coating composition prior to addition of the polyisocyanate component.

The solutions of resin condensate which are used in accordance with the invention are formulated into a polyurethane coating composition by the addition thereto of an organic polyisocyanate which may be added per se or in solution in an inert organic solvent. Simple mixing is sufficient. The mixture is applied as a layer by brushing, spraying, roller coating or like means on any suitable substrate and, as is known, the isocyanate groups on the organic polyisocyanate react at room temperature with active hydrogen in the composition such as is provided by the residual hydroxy groups on the resinous polyhydric alcohol or by the silicon —OH groups to form urethane linkages which cure the coating on the surface to which it is applied. Carboxy groups which may be present in the resinous polyhydric alcohol participate in this cure. Also, the silicon methoxy groups lose methanol during the air dry to generate the OH group in situ and this also participates in providing active hydrogen to participate in the isocyanate cure.

Any suitable organic polyisocyanate may be used, including aliphatic, cycloaliphatic, alkaryl, aralkyl, heterocyclic and aryl polyisocyanates, such as, for example, diisocyanates, and particularly there may be used tetramethylene diisocyanate, pentamethylene diisocyanate, octamethylene diisocyanate, dodecamethylene diisocyanate, 3,3′-diisocyanate dipropyl ether, xylylene diisocyanates, para,para′-diphenylmethane diisocyanate, beta,beta′-diphenyl propane-4,4′-diisocyanate, and the like. Other examples are meta-phenylene diisocyanate, para-phenylene diisocyanate, 1-methyl phenylene-2,4-diisocyanate, 2,6-toluylene diisocyanate, 1,3,5-benzene triisocyanate, para,para′,para″-triphenylmethane triisocyanate, and the like. Also, the addition products of a stoichiometric excess of polyisocyanates with low molecular weight alcohols such as 1,4-butane diol, glycerine, trimethylol propane, the hexane diols and hexane triols and addition products of the aforementioned polyisocyanates, with low molecular weight polyesters, such as castor oil, may also be used.

As will be evident from the foregoing, the class of organic polyisocyanate is a known one and numerous further materials which are well known to the art fall in the class and may be used. It is stressed, however, that diisocyanates based on bisaromatic compounds are preferred, especially to provide superior adhesion despite water immersion. Bisaromatic compounds identify a pair of aromatic groups separated by an intervening divalent aliphatic group. Most preferably, one of the two isocyanate groups is carried by each of the aromatic groups. diphenylmethane - 4,4′ - diisocyanate illustrates preferred practice.

In general, the amount of polyisocyanate used depends on the amount of active hydrogen present in the resin condensate. It is preferred to employ the polyisocyanate in a stoichiometric balance with respect to the active hydrogen. A stoichiometric excess of up to about 100% may be tolerated, the excess being consumed by reaction with the moisture in the atmosphere. The function of the isocyanate is to cross-link the resinous condensate and small quantities are quite useful for this purpose. Thus, as little as about 5% of the stoichiometric amount provides a useful curing reaction.

The same solvents noted for the resinous polyhydric alcohol are also capable of dissolving the organic polyisocyanate and solvent selection is of secondary significance so long as the solvent is inert in the sense that it is not reactive with the isocyanate group and volatilizes from the film which is deposited. Since reactive polyisocyanates are used herein, all of the materials and solvents should be of urethane grade which identifies the substantial absence of water.

If desired, a catalyst may be added to the resin condensate to facilitate the curing reaction. Suitable catalysts are known to the art and are exemplified by tertiary amines including triethylene diamine, hexahydrodimethyl aniline, and organometallic compounds such as dibutyl tin dilaurate and stannous octoate.

The coating compositions of the invention, formulated by mixing together the resin condensate with the organic polyisocyanate, are initially somewhat on the thin side and coating viscosity is acquired by urethane formation within a few minutes so the coating composition can be aptly termed a polyurethane. Thereafter, the polyurethane forming reaction proceeds slowly providing several hours of useful working time before the mixture becomes unduly thick. Accordingly, the coating composition as it is applied is a polyurethane and the polyurethane-forming reaction continues to complete the cure on the substrate which is coated.

While the coating compositions of the invention are of particular value in the deposition of weather resistant coatings on wood and metal surfaces intended to be cured at room temperatures, it will be appreciated that other substrates such as ceramics, concrete, etc., may be coated and that heat may be used to speed the cure if desired.

The invention is illustrated in the examples which follow.

EXAMPLE 1

Part A: Preparation of Hydroxy Functional Acrylic Prepolymer

| Parts by weight | Preparation |
|---|---|
| 500 xylol | Charge into reactor equipped with an agitator, reflux condenser, separatory funnel and nitrogen inlet tube. |
| 750 methyl methacrylate | Premix. Add 300 parts to xylol and heat to 135° C. Add the remainder over over a 2½ hour period at 135–140° C. Hold for 1 hour. |
| 750 butyl acrylate | |
| 500 Hydroxyethyl methacrylate | |
| 26 tertiary butyl perbenzoate | |
| 6 tertiary butyl perbenzoate | Add. Hold for 2 hours. |
| 800 2-ethoxy ethanol acetate | Add to 62% solids. |

Part B: Preparation of hydroxy acrylic-siloxane condensate containing 40% siloxane

| Parts by weight | Preparation |
|---|---|
| 1080 hydroxy functional acrylic prepolymer of Part A (62% solids). | Charge into reactor equipped with an agitator, Dean-Stark trap, nitrogen inlet tube, and reflux condenser. Heat to 135–140° C. and distill off 18 cc. of H$_2$O. |
| 430 organosilicon resinous material (variation of Disilanol A with hydroxy content of 5.5%). | |
| 600 2-ethoxy ethanol acetate | |

Final characteristics of the acrylic-siloxane condensate

Solids (percent) _____ 51
Viscosity (Gardner) _____ 0
Hyroxyl number _____ 37

EXAMPLE 2

Preparation of hydroxy acrylic-siloxane condensate containing 30% siloxane

| Parts by weight | Preparation |
|---|---|
| 500 Hydroxy acrylic prepolymer of Example 1, Part A. | Charge into a reactor equipped with an agitator, Dean-Stark trap, nitrogen inlet tube, and reflux condenser. Heat to 150° C. to dehydrate the system and collect water in the Dean-Stark trap. Cool to 65° C. |
| 133 Methoxy siloxane (15% methoxy). | |
| 287 2-ethoxy ethanol acetate | |
| 0.4 tetrakis (2-ethyl hexyl) titanate. | Add. Reheat to 137° C. and distill-off methanol to condense methoxy groups. Hold for viscosity of T-U. Cool to room temperature. |

Final characteristics of acrylic-siloxane condensate

Solids (percent) _____ 47.1
Viscosity (Gardner) _____ T–U
Color (Gardner) _____ 1–2

EXAMPLE 3

Part A: Preparation of hydroxy functional polyester resin

| Parts by weight | Preparation |
|---|---|
| 928 hydrogenated bisphenol "A" | Charge into a reactor equipped with an agitator, reflux condenser, Dean-Stark trap, and nitrogen inlet tube. Heat to 215° C. and hold until homogeneous while distilling-off water of esterification. |
| 130 trimethylol propane | |
| 264 isophthalic acid | |
| 2 triphenyl phosphite | |
| 15 xylene | |
| 5 2-ethoxy ethanol acetate | |
| 266 azelaic acid | When resin becomes clear, add azelaic acid. Reheat to 240° C. and hold for an acid value of 10. When acid value is reached add solvent. |
| 349 Methyl iiobutyl ketone | Add to 80% solids. |

Final characteristics of hydroxy functional polyester

Solids (percent) _____ 79.5
Acid value _____ 11.0

Part B: Preparation of hydroxy polyester-siloxane condensate

| Parts by weight | Preparation |
|---|---|
| 1596 hydroxy polyester of Part A (79.5% solids). | Charge into reactor. Heat to 140° C. Distill-off 7 grams H$_2$O and collect in a Dean-Stark trap. At the same time distill-off 110 grams methyl isobutyl ketone. |
| 320 organosilicon resinous material.[1] | |
| 239 methyl isobutyl ketone | |
| 22.2 hydroxy siloxane | Reheat to 155° C. and distill-off water to a total of 17 grams (120 grams methyl isobutyl ketone also distilled off). |
| 0.5 tetraisopropyl titanate | |
| 32 methyl isobutyl ketone | |
| 239 methyl isobutyl ketone | Add. |

[1] See Example 1.

Final characteristics of hydroxy polyester-siloxane condensate

Solids (percent) _____ 82.2
Acid value _____ 7.0
Color (Gardner) _____ 2–3

EXAMPLE 4

Preparation of hydroxy polyester-siloxane condensate

| Parts by weight | Preparation |
|---|---|
| 464 ethylene glycole | |
| 134 trimethylol propane | |
| 368 phthalic anhydride | Heat to 210° C. and hold for an acid value of 6.5. |
| 478 azelaic acid | |
| 2 triethyl phosphite | |
| 50 xylol | |
| 600 organosilicon resinous material [1] | Cool to 80° C. add. Reheat to 160° C. and distill-off water of condensation and 160 grams of methyl isobutyl ketone. |
| 200 methyl isobutyl ketone | |
| 0.5 tetraisopropyl titanate | |
| 772 xylol | Add to 70% resin solids. |

[1] See example 1.

Final-characteristics of polyester-siloxane condenate

Solids (percent) _____ 69.6
Viscosity (Gardner) _____ N
Color (Gardner) _____ 2–3
Hydroxyl number _____ 107

The resin solutions described in the foregoing examples are useful as coatings for wood in which event they can be reduced to appropriate coating viscosity for application by brush or by spray as desired utilizing any organic solvent, and the coatings may be pigmented as is conventional for solvent-based paints intended for application to exterior wood surfaces.

EXAMPLE 5

An air-dry pigmented primer composition useful in the invention is prepared as follows.

| Procedure of formulation | Preparation |
|---|---|
| 100 parts strontium chromate | |
| 200 parts finely divided talc | |
| 100 parts fibrous talc | Grind in a pebble mill to |
| 50 parts titanium dioxide rutile | a grind rating of 5½ |
| 350 parts product of Example 4 (69.6% solution in xylol) | North Standard. |
| 200 parts ethyl acetate solvent | |
| 22 parts cyclohexanone | |
| 100 parts product of Example 4 | Remove from mill and |
| 59 parts ethyl acetate solvent | mix in. |
| 4 parts dibutyl tin dilaurate | |

The pigmented resin solution prepared above is then mixed with a polyisocyanate curing solution constituted by 872 parts of diphenylmethane-4,4'-diisocyanate which has been thinned with 106 parts methyl ethyl ketone. This mixing is done shortly before use.

When it is desired to utilize the primer, 4 volumes of the pigmented resin solution are mixed with 1 volume of the polyisocyanate solution. Four volumes of a solvent mixture of 236.1 parts of cyclohexanone and 518 parts of ethyl acetate are then added and the mixture is allowed to thicken to the desired viscosity for handling. For spray application, this occurs in about ½ hour.

The primer composition, after standing for ½ hour is sprayed on aluminum panels (.5 to 1 mil dry thickness) and allowed to air-dry. In approximately 1 hour, the panels dry sufficiently to permit handling. The curing reaction continues and the panels are fully cured for evaluation in seven days.

With respect to wet adhesion, it was found that the coated panels could be immersed in distilled water for 7 days and the coatings remained strongly adherent to the base, thus illustrating the uniquely superior wet adhesion exhibited by the coatings of the invention.

With respect to high temperature resistance, it was found that the coated panels could withstand 96 hours exposure at 500° F., followed by salt spray exposure for two weeks. Comparable air dried coatings tend to break down upon such elevated temperature exposure making them unable to withstand salt spray.

The primed panels can be topcoated in any desired fashion, e.g., by the application of conventional epoxy resin or urethane coatings.

It will be appreciated that numerous variations can be made in the foregoing examples as, for example, anti-settling or anti-cratering agents may be used to exert their known effects. Similarly, the coatings can be used over various bases including wood, ferrous and non-ferrous surfaces, including aluminum, aluminum alloyed with copper or zinc and magnesium surfaces and the like. As will also be evident, water is detrimental since it causes premature reaction of the isocyanate and, as a result, both of the components of the two component system of the invention should be kept tightly sealed in order to insure best results when used.

The invention is defined in the claims which follow.

We claim:

1. A polyurethane coating composition which is air-drying at ambient temperatures and which comprises an inert organic solvent solution of the reaction product prepared by the process which comprises reacting an organic polyisocyanate with a resinous condensate of a hydroxy functional solution addition copolymer largely constituted by esters of monoethylenically unsaturated monocarboxylic acids, said addition copolymer containing from 1 to 20% by weight of the hydroxy group provided by copolymerized monoethylenically unsaturated hydroxy functional monomer, said hydroxy functional copolymer having condensed therein an organosilicon resinous material having at least 1.2 silicon-carried OH or alkoxy groups per molecule, and which is an organopolysiloxane having the formula

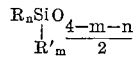

where R is a monovalent hydrocarbon radical, R' is selected from the group consisting of alkoxy radicals and the hydroxy radical, $n$ has an average value of from 1 to 2, and $m$ has an average value of at least 0.1, the sum of $m$ and $n$ being no more than 3, there being an average of at least 1.2 R' groups present per organopolysiloxane molecule, said organosilicon resinous material being present in an amount of from 10 to 50% based on the weight of the condensate and being condensed with said hydroxy functional copolymer to react from 5–90% of the silicon-carried hydroxy or alkoxy groups and providing a condensate having an hydroxy value of at least 10.

2. A polyurethane coating composition as recited in claim 1 in which said copolymer consists essentially of said hydroxy functional monomer and acrylate, methacrylate and crotonate esters.

3. A polyurethane coating composition as recited in claim 1 in which said hydroxy functional copolymer is a solution addition copolymer comprising methyl methacrylate copolymerized with esters of acrylic and methacrylic acid which form soft polymers.

4. A polyurethane coating composition as recited in claim 1 in which hydroxy functional monomer is present in an amount providing said copolymer with from 3–10% by weight of the hydroxy group.

5. A polyurethane coating composition as recited in claim 1 in which said solution contains at least 30% by weight of resin solids.

6. A polyurethane coating composition as recited in claim 1 in which said organopolysiloxane is condensed to eliminate at least 50% of the water or alcohol of reaction.

7. A polyurethane coating composition as recited in claim 1 in which said organosilicon resinous material is present in an amount in excess of 20% based on the weight of the condensate and said condensate has an hydroxy value of at least 15.

8. A polyurethane coating composition as recited in claim 1 in which said polyisocyanate is used in an approximately stoichiometric amount with respect to the available active hydrogen in the hydroxy functional copolymer-organosilicon condensate.

9. A polyurethane coating composition as recited in claim 1 in which said organic polyisocyanate is diphenylmethane, 4,4'-diisocyanate.

References Cited

UNITED STATES PATENTS

| 2,843,560 | 7/1958 | Mika | 260—824 |
| 2,901,449 | 8/1959 | Schwarz et al. | 260—824 |
| 2,929,794 | 3/1960 | Simon et al. | 260—824 |
| 3,115,479 | 12/1963 | Windemuth et al. | 260—824 |
| 3,261,881 | 7/1966 | Christenson et al. | 260—827 |
| 3,318,971 | 5/1967 | Chloupek et al. | 260—827 |
| 3,346,664 | 10/1967 | Yuhas et al. | 260—827 |
| 3,384,599 | 5/1968 | Omietamski et al. | 260—824 |
| 3,400,173 | 9/1968 | Reischl et al. | 260—824 |
| 3,450,791 | 6/1969 | Sekmakas et al. | 260—824 |
| 2,931,786 | 4/1960 | Clark et al. | 260—46.5 |

OTHER REFERENCES

Nowak et al., German application 1,096,521, printed Jan. 5, 1961.

SAMUEL H. BLECH, Primary Examiner

U.S. Cl. X.R.

117—75, 123, 132, 148; 260—22, 23, 31.2, 31.4, 32.8, 33.6, 41, 824

PO-1050
(5/69)

UNITED STATES PATENT OFFICE
CERTIFICATE OF CORRECTION

Patent No. 3,539,658     Dated November 10, 1970

Inventor(s) Kazys Sekmakas and Frank Daar

It is certified that error appears in the above-identified patent and that said Letters Patent are hereby corrected as shown below:

Column 3, line 71, "phthailc" should read --phthalic--.
Column 6, line 46, "bases" should read --basis--.
Column 6, after line 67, the following should be inserted to start a new paragraph: --Accordingly, and in line with conventional--.
Column 6, line 69, delete the entire line.
Column 6, line 75, "redicals" should read --radicals--.
Column 10, line 8, "osy)." should read --oxy).--.
Column 10, line 31, "iiobutyl" should read --isobutyl--.
Column 10, line 56, "glycole" should read --glycol--.
Column 12, claim 1, line 17 (line 3 from end of claim), "5-90%" should read --5-95%--.

SIGNED AND
SEALED
JAN 19 1971

(SEAL)
Attest:

Edward M. Fletcher, Jr.
Attesting Officer

WILLIAM E. SCHUYLER, JR.
Commissioner of Patents